| | | | |
|---|---|---|---|
| United States Patent [19] | | [11] | 4,397,986 |
| Hornbaker | | [45] | Aug. 9, 1983 |

[54] THERMOPLASTIC POLYESTER BLENDS

[75] Inventor: Edwin D. Hornbaker, Baton Rouge, La.

[73] Assignee: Ethyl Corporation, Richmond, Va.

[21] Appl. No.: 354,468

[22] Filed: Mar. 3, 1982

[51] Int. Cl.³ ................. C08L 51/04; C08L 67/02
[52] U.S. Cl. ........................... 525/64; 525/166; 525/173; 525/175; 525/176
[58] Field of Search ............... 525/176, 64, 175, 166, 525/173

[56] References Cited

U.S. PATENT DOCUMENTS

| | | | |
|---|---|---|---|
| 2,927,095 | 3/1960 | Witt | 525/78 |
| 3,435,093 | 3/1969 | Cope | 525/176 |
| 3,639,527 | 2/1972 | Brinkmann | 525/64 |
| 3,644,574 | 2/1972 | Jackson | 525/176 |
| 3,763,109 | 10/1973 | Witsiepe | 528/301 |
| 3,766,146 | 10/1973 | Witsiepe | 528/274 |
| 3,784,520 | 1/1974 | Hoeschele | 528/301 |
| 3,839,308 | 10/1974 | Carrock | 526/200 |
| 4,022,748 | 5/1977 | Schlichting | 525/176 |
| 4,275,182 | 6/1981 | Priddy | 526/109 |
| 4,294,938 | 10/1981 | Berr | 525/101 |
| 4,303,573 | 12/1981 | Ostapohenko | 525/64 |
| 4,327,199 | 4/1982 | Coran | 525/176 |
| 4,346,195 | 8/1982 | Hornbaker | 525/176 |

Primary Examiner—Allan Lieberman
Assistant Examiner—Patricia Short
Attorney, Agent, or Firm—Donald L. Johnson; John F. Sieberth; Henry C. Jeanette

[57] ABSTRACT

Polyblends comprising polyethylene terephthalate, or a copolyester or blend thereof containing at least 80 percent by weight of polyethylene terephthalate, and a thermoplastic copolymer of (1) at least one vinyl aromatic monomer, (2) acrylic acid or methacrylic acid, or both, and (3) optionally at least one additional copolymerizable termonomer have useful properties, notably higher heat deflection temperatures than the corresponding unblended polyester.

18 Claims, No Drawings

THERMOPLASTIC POLYESTER BLENDS

TECHNICAL FIELD

This invention relates to polyblends containing polyethylene terephthalate.

BACKGROUND

Polyethylene terephthalate is a thermoplastic polyester useful for various applications such as moldings, films, and fibers. While having a number of useful properties, the utility of this polyester for injection and extrusion molding applications would be enhanced if ways could be found to overcome certain deficiencies such as high deformation tendencies of molded parts when maintained under load at elevated temperatures. In its unreinforced state, polyethylene terephthalate has relatively low heat deflection temperatures (HDT) when measured under standard ASTM test conditions under constant load (usually at 264 or 66 psi).

U.S. Pat. No. 3,644,574 discloses blends of 1,4-butane diol polyesters with from about 1 to about 40 weight percent of a vinyl aromatic polymer (e.g., a styrenic polymer) which may be a copolymer, block polymer, graft polymer, or blend containing up to 50 weight percent of polymer units derived from one or more of the following: olefins containing up to 8 carbon atoms, vinyl naphthalene, divinylbenzene, alkyl esters of acrylic and methacrylic acids wherein the alkyl groups contain from 1 to 4 carbon atoms, acrylonitrile, methacrylonitrile, maleic anhydride, vinyl acetate, and other polymerizable compounds containing a

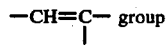

group and which give copolymers which are stable under the forming conditions. The blends referred to in the patent exhibit increased HDT as compared to the unblended polyester. The patent states that the improvements obtained with polybutylene terephthalate are not obtained when the polyester is polyethylene terephthalate.

THE INVENTION

According to this invention, there is provided a thermoplastic polyblend composition comprising:
(A) a thermoplastic polyester, notably polyethylene terephthalate, and
(B) a thermoplastic copolymer of
 (1) at least one vinyl aromatic monomer,
 (2) acrylic acid or methacrylic acid, or both, and
 (3) optionally at least one additional copolymerizable termonomer.

While the proportions may be varied, it is preferred that the polyblend composition contain 95 to 25% by weight of component (A) and, correspondingly, 5 to 75% by weight of component (B).

In accordance with another embodiment of this invention, the foregoing polyblend further includes an impact modifier.

These and other features, embodiments and advantages of the invention will become still further apparent as the description proceeds.

Component (A) of the polyblends of this invention is polyethylene terephthalate. Although use of the homopolymeric material is preferred, copolyesters or blends of thermoplastic polyesters containing at least 80 percent by weight of polyethylene terephthalate may be used. If desired, the polyethylene terephthalate or copolyester or blend thereof can contain halogen atoms. Such polyesters are normally formed by condensation of halogenated, preferably brominated, terephthalic acid (e.g., 2,5-dibromoterephthalic acid or 2,3,5,6-tetrabromoterephthalic acid) and terephthalic acid with ethylene glycol. Similarly, the polyethylene terephthalates used herein can contain up to about 20 percent, relative to the acid component, of radicals of other dicarboxylic acids such as, for example, phthalic acid, isophthalic acid, naphthalene 2,6-dicarboxylic acid, diphenyl-4,4'-dicarboxylic acid and the like, as well as their halogenated counterparts. If desired, the polyesters may contain up to about 20 percent relative to the glycol component of radicals of other glycols such as, for example, 1,3-propane diol, 1,4-butane diol, 1,4-cyclohexane dimethanol, dibromoneopentyl glycol, the bis(2-hydroxyethyl) ether of tetrabromobisphenol-A, and tetra-bromo-p-xylylene glycol. Typical of the copolyesters which may be employed are those prepared from terephthalic acid, ethylene glycol, and cyclohexane dimethanol; those prepared from terephthalic acid, isophthalic acid and ethylene glycol; and those prepared from terephthalic acid, isophthalic acid, ethylene glycol and bisphenol-A. Exemplary materials used in amounts of up to about 20 percent by weight in combination with polyethylene terephthalate include polypropylene terephthalate, polybutylene terephthalate (PBT), the polyester prepared from terephthalic acid and cyclohexane dimethanol, and the like. Polyethylene terephthalate is available commercially from a number of sources and methods for its preparation are well known and reported in the literature. See, for example, U.S. Pat. Nos. 2,465,319; 3,047,539 and Kirk-Othmer, *Encyclopedia of Chemical Technology*, Second Edition, Volume 16, pages 161–173 (1968), which are incorporated herein by reference.

The polyethylene terephthalates (including the copolyesters and blends thereof) used in accordance with this invention should be moldable, i.e., injection moldable or moldable by extrusion, and thus generally will have an intrinsic viscosity (I. V.) falling between about 0.4 and about 1.5 as measured at 25° C. using a solvent consisting of 60% by weight of phenol and 40% by weight of tetrachloroethane. For most injection molding applications polyethylene terephthalates in which the I. V. is in the range of 0.5 to 0.9 are deemed most desirable.

The component (B) thermoplastic copolymers are formed by the interpolymerization of at leat two comonomers, namely one or more vinyl aromatic monomers and acrylic acid or methacrylic acid, or both. Optionally, one or more copolymerizable termonomers may be incorporated in the polymer. The preferred vinyl aromatic monomer is styrene. However, substituted styrenes may be used either in place of or together with styrene in forming the component (B) copolymer. A few illustrative substituted styrenes include alkyl substituted styrenes such as o-methylstyrene, m-methylstyrene, p-methylstyrene, p-tert-butylstyrene, the various dimethylstyrenes, alpha-methylstyrene and the like. Halogen substituted styrenes such as chlorostyrenes, dichlorostyrenes, bromostyrenes and dibromostyrenes may also be used. Likewise use may be made of fused ring vinyl aromatic monomers, such as 1-vinylnaphthalene, 2-vinylnaphthalene, and their alkyl and/or halogen substituted counterparts, these monomers usually being employed in combination with a monocyclic styrenic monomer such as styrene or p-methylstyrene.

Among the optional copolymerizable termonomers which may be used in making the component (B) copolymers are olefins, aliphatic or aromatic esters of unsaturated esters, unsaturated ethers, unsaturated nitriles, vinyl halides, vinyl esters, and like substances. A preferred group of copolymerizable monomers includes $C_4$–$C_6$ alpha-olefins, $C_1$–$C_3$ alkyl esters of acrylic or methacrylic acid, acrylonitrile, and methacrylonitrile.

The component (B) copolymers may be rubber-free, such materials sometimes being referred to as 'crystal' copolymers. Preferably, however, the component (B) copolymer is a rubber-modified graft copolymer. As is well known in the art, these materials are prepared by copolymerizing the monomers in the presence of a rubber substrate in such a way that a uniform copolymer of the polymerizing monomers is grafted onto the rubber substrate and a matrix copolymer of essentially the same composition as the graft copolymer is simultaneously generated. A typical procedure of this type involves forming a solution of a substrate rubber, the vinyl aromatic monomer(s), the acrylic or methacrylic acid(s), the termonomer(s) if used, and a chain transfer agent in a suitable solvent. Polymerization is initiated catalytically and is conducted at a temperature below about 120° C. During the polymerization a solution of the acrylic or methacrylic acid(s) and the termonomer(s) if used, is added continuously or at frequent intervals. The temperature is usually elevated to about 120° C. or higher during the last two hours of the polymerization, a total polymerization period of about six to eight hours being satisfactory in most instances.

In accordance with conventional practice, the rubber substrate will have a glass transition temperature below 0° C. Exemplary rubbers for use in preparing these copolymers include polybutadiene, polyisoprene, butadiene-styrene copolymers, butadiene-acrylonitrile copolymers, polychloroprene, ethylene-propylene copolymers, ethylene-propylene-diene-monomer terpolymers (EPDM), polypentenamers, ethylene-vinyl acetate copolymers and ethylene-alkyl acrylate copolymers. Use of cis-1,4-polybutadiene or butadiene-styrene copolymer rubber is generally preferred.

To initiate the polymerization use may be made of any of a variety of free radical generating catalysts including peroxy and azo catalysts. Exemplary of the former are di-tert-butyl peroxide, dicumyl peroxide, tert-butyl hydroperoxide, cumene hydroperoxide, p-isopropylcumene hydroperoxide, p-menthane hydroperoxide, cyclopentane hydroperoxide, pinane hydroperoxide, benzoyl peroxide, lauroyl peroxide, tert-butyl peracetate, tert-butyl perbenzoate, tert-butyl per-neodecanoate, oleyl peroxide, toluyl peroxide, and tert-butyl peroctoate. Azo-bis-isobutyronitrile and the like exemplify the azo catalysts which may be employed. These catalysts may be used alone or in combinations. Molecular weight regulators (chain transfer agents) which may be used include mercaptans, halides, terpenes, and the like. During or after the polymerization small amounts of antioxidants or stabilizers such as alkylated phenols and organic phosphites may be added to the polymerization mixture.

Solvents normally used in the process include aromatic hydrocarbons such as toluene, xylene and ethylbenzene, and ketones such as methyl ethyl ketone, dibutyl ketone, and ethyl hexyl ketone, and similar substances. Solvents will usually be employed in the range of from about 5 to 150 parts per 100 parts by weight of the monomers used. Separation of the polymer from the solvent can be achieved in various ways such as by precipitation with a nonsolvent or by removal of the volatile materials by heating the reaction product under reduced pressure.

Additional information concerning the synthesis of vinyl aromatic/acrylic acid and/or methacrylic acid copolymers, both rubber free and rubber modified is reported in the literature. See for example U.S. Pat. Nos. 2,927,095; 3,839,308 and 4,275,182, the disclosures of which are incorporated herein by reference.

The proportions of the polymerized comonomers in component (B) may be widely varied so long as the resultant polyblend has reasonable compatability. The preferred component (B) copolymers are those containing by weight from about 95 to about 70 percent of one or more vinyl aromatic monomers and from about 5 to about 30 percent of acrylic acid, methacrylic acid, or a mixture of the two. In the case of the terpolymers the content of the acrylic acid and/or methacrylic acid will range from about 5 to about 30 percent by weight, and the content of the termonomer(s) will range from about 1 to about 30 percent by weight, with the balance being one or more copolymerized vinyl aromatic monomers. The amount of rubber in the preferred component (B) graft copolymers may be varied within considerable limits and may range from trace amounts up to as much as about 30 percent by weight based on the weight of the copolymerized monomers. Preferably however, component (B) contains up to about 25 percent by weight of the substrate rubber(s). Thus pursuant to a preferred embodiment of this invention there is provided a thermoplastic polyblend composition comprising:

(A) polyethylene terephthalate, or a copolyester or a blend of thermoplastic polyesters containing at least 80 percent by weight of polyethylene terephthalate, and (B) a rubber-modified thermoplastic copolymer of
  (1) at least one vinyl aromatic monomer,
  (2) acrylic acid or methacrylic acid, or both, and
  (3) optionally, at least one additional copolymerizable termonomer,
said copolymer grafted onto a substrate rubber.

Most preferably the copolymer of (B) contains up to about 25% by weight of the substrate rubber, and the relative proportions of components (A) and (B) in said blend are 95 to 25% by weight of (A) and 5 to 75% by weight of (B) exclusive of the substrate rubber phase.

In a preferred embodiment an impact modifier is included as a component of the polyblends. The impact modifiers used include ABS and MBS impact modifiers (i.e., a graft copolymer of (i) acrylonitrile or methyl methacrylate, or both, and (ii) a vinyl aromatic monomer, said copolymer grafted onto a substrate rubber), ethylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), oxidized polyethylene, styrene-butadiene-styrene (S-B-S) block copolymers, styrene/butadiene multiblock copolymers, stryene/butadiene radial block copolymers, hydrogenated S-B-S block copolymers, styrene-butadiene rubber, acrylic rubbers, EPDM, ethylene/acrylic acid copolymers, ethylene/methyl acrylate copolymers, ethylene/ethyl acrylate copolymers, polyester-ether multiblock copolymers, and the like. These materials are available within the range of molecular weights and it is generally desirable that the impact modifer, when used, have a melt viscosity close to that of the substrate. Amounts of such impact modifiers generally fall within the range of from about 5 to about 40 percent by weight of the polyblend.

While various impact modifiers are suitable for use in the blends of this invention one preferred type is the polyether-ester segmented block copolymers, a number of which are available commercially from E. I. DuPont Company under the trademark Hytrel. The composition and synthesis of these copolyetherester block copolymers have been described in the literature—see for example U.S. Pat. Nos. 3,784,520; 3,766,146 and 3,763,109, the disclosures of which are incorporated herein by reference.

Ionomer resins constitute another preferred type of impact modifiers used pursuant to this invention. The composition and synthesis of such materials are known in the art. Note for example U.S. Pat. No. 3,435,093, the disclosure of which is incorporated herein by reference.

Also preferred as impact modifiers are styrene-butadiene-caprolactone terpolymers, notably styrene-butadiene block copolymers end-capped with polycaprolactone. Such materials are known and available in the art, for example from Phillips Petroleum as PD 0071-81.

Other ingredients, such as stabilizers, antioxidants, flame retardants, extenders, processing aids, pigments, and the like can be incorporated in the polyblends of this invention. Likewise reinforcing fillers in amounts sufficient to impart reinforcement or improved impact resistance can be used, examples including such materials as carbon filaments; metals; ceramics; silicates, e.g., acicular calcium silicate; asbestos; titanium dioxide; potassium titanate; titanate whiskers; glass flakes; and glass fibers. Preferred reinforcing fillers are glass fibers and particulate mineral fillers, such as mica and the like. In general, optimum mechanical properties can be obtained using amounts of reinforcing fillers in the range of from about 5 to about 40 percent by weight based on the total weight of the polyblend and filler. However, higher amounts can be used if desired.

For improving the thermal stability and resistance to oxidative degradation, the customary amounts of stabilizers, preferably 0.001 to 0.5 percent by weight, relative to the unfilled and unreinforced compositions of this invention can be incorporated in the polyblends. Examples of suitable stabilizers are phenols and phenol derivatives, preferably sterically hindered phenols which contain alkyl substitutents with up to 6 carbon atoms in the position(s) ortho to the phenolic hydroxyl group(s); amines, preferably secondary arylamines and their derivatives; phosphates and phosphites, preferably the aryl derivatives thereof; and quinones. A few specific illustrations include:

4,4'-bis(2,6-di-tert-butylphenol);
1,3,5-trimethyl-2,4,6-tris(3,5-di-tert-butyl-4-hydroxybenzyl)-benzene;
4,4'-butylidene-bis(6-tert-butyl-m-cresol);
3,5-di-tert-butyl-4-hydroxybenzyl-phosphonic acid diethyl ester;
N,N'-bis(beta-naphthyl)-p-phenylenediamine;
N,N'-bis(1-methylheptyl)-p-phenylenediamine; phenyl-beta-naphthylamine;
4,4'-bis(alpha,alpha-dimethylbenzyl)-diphenylamine;
hydroquinone;
p-benzoquinone;
toluhydroquinone;
p-tert-butylpyrocatechol;
chloranil; and
naphthoquinone.

Combinations of hindered phenolic antioxidants and organic phosphites are particularly useful.

Flame-retarding additives which can be used comprise a large number of chemical compounds well known to those skilled in the art. In general, they contain chemical elements having known flame-retarding capability such as bromine, chlorine, antimony, phosphorus, and nitrogen. Preferably, the flame-retardants are halogenated (chlorinated or more preferably, brominated) organic compounds optionally used together with auxiliary compounds sometimes referred to as synergists, such as antimony trioxide, zinc borate, or the like. Elementary phosphorus, inorganic phosphorus compounds such as ammonium polyphosphate, and organic phosphates and phosphites serve as examples of phosphorus containing flame-retardants suitable for use in the blends of this invention. Other examples include bromine or chlorine containing organic phosphate and phosphite esters, hexaphenoxyphosphazene, and the like. For best results the flame-retardant when of the additive type should be a relatively non-volatile substance and thus commercially available oligomeric type phosphorus and/or bromine containing materials can be used to good advantage.

The polyblends of this invention may be prepared by conventional blending procedures. For example the components of the blend may be blended in a mixer (e.g., a Henschel mixer) and the resultant blend compounded on an extruder (e.g., a single-screw or twin-screw compounding extruder). Thereafter the extrudate is chopped into pellets suitable for packaging, shipping, storage and use in molding operations In accordance with known practice, polyethylene terephthalate polyblends should be dried before use in molding operations, and for this purpose use may be made of a circulating air over or the like.

The present invention is further illustrated by the following examples, which are not to be construed as implying any limitation on the scope of the invention.

EXAMPLES I–IV

The following materials were blended and compounded on a single-screw extruder at temperatures of about 525° to about 550° F. (274°–288° C.):

(A) Polyethylene terephthalate; from American Enka identified as Enka T-0740, and having an intrinsic viscosity (measured as described above) of about 0.6.

(B) Styrene-acrylic acid copolymer (SAA copolymer); from Dow Chemical Company, identified as XP 71001.01, an experimental polymer with an acrylic acid content of approximately 8 percent.

These materials were blended in proportions of 70 and 55 weight percent polyethylene terephthalate and correspondingly either 30 or 45 weight percent of the styrene-acrylic acid copolymer. In addition, samples of the 70/30 blend were compounded with 10 percent by weight (based on the weight of the blend of PET/styrene acrylic acid copolymer) of either Surlyn 1650, an ionomer resin obtained from E. I. DuPont & Company, or Hytrel 4056, a copolyetherester segmented block copolymer. The resultant blends were molded into test pieces on a New Britain injection molding machine and the physical properties of the blends were determined by subjecting the test pieces to standard ASTM procedures as follows:

Specific Gravity—D 792-66 (1975);
Flexural Strength and Flexural Modulus—D 790-71 (1978);
Izod Impact Strength (with and without notch)—D 256-78;
Heat Deflection Temperature (HDT)—D 648-72 (1978).

Table I summarizes the test results and also sets forth for comparative purposes the heat deflection temperature of the Enka T-0740 polyethylene terphthalate.

Blending and testing of rubber-modified graft copolymer

A blend of this invention was prepared as in Examples I–IV using the rubber-modified graft copolymer of styrene-acrylic acid prepared above which had been dried in an oven at 100° to 105° C. for approximately 4 hours. The polyethylene terephthalate used was Goodyear Vituf 5901. It had been oven dried either over night at 135°–160° C. or for approximately 6 hours at 170°–175° C. The hot dried pellets of these two polymers were quickly weighed and sealed in nylon-film bags, and the sealed bags were stored in an oven at 100°–105° C. until compounded. Manual agitation of the bags was used to achieve a uniform blend of feed pellets.

TABLE I

| Proportions, PET/SAA copolymer: Impact Modifier added: Properties | Example I 70/30 None | Example II 55/45 None | Example III 70/30 Surlyn 1650 | Example IV 70/30 Hytrel 4065 | Control 100/0 None |
|---|---|---|---|---|---|
| Specific Gravity | 1.252 | 1.209 | 1.211 | 1.234 | — |
| Flexural Strength, $10^3$ psi | 14.3 | 13.2 | 12.6 | 13.3 | — |
| Flexural Modulus, $10^3$ psi | 419 | 433 | 340 | 356 | — |
| Izod Impact Strength*, ft-lb/in | 0.4 | 0.3 | 0.4 | 0.6 | — |
| Izod Impact Strength**, ft-lb/in | 0.4 | 0.3 | 0.4 | 0.5 | — |
| Izod Impact Strength***, ft-lb/in | 6.2 | 4.6 | 9.3 | 14.7 | — |
| HDT @ 264 psi, °C. | 89 | 97 | 88 | 77 | 72 |

*Using notched ¼ inch test bars
**Using notched ⅛ inch test bars
***Using unnotched ¼ inch test bars
—Means no measurement was made

EXAMPLE V

Preparation of rubber-modified graft copolymer

Into a polymerization reactor equipped with an agitator and a reflux condenser were charged 580 grams of styrene, 3.0 grams of terpenolene and 200 ml of ethylbenzene. Then 80 grams of high cis-polybutadiene from Goodyear Tire & Rubber Company (Budene 1208) was dissolved in the mixture. After the rubber had dissolved, a solution of 40 grams of acrylic acid in 60 ml of methyl ethyl ketone (335 ml) was introduced into the mixture. The temperature of the reaction mixture was raised to 85° C. and maintained at this level during the ensuing polymerization. Polymerization was initiated by introducing into the system a mixture of 0.2 ml of tert-butyl peracetate and 0.2 ml of tert-butyl per-neodecanoate. One hour later, continuous addition of a solution of 40 grams of acrylic acid and 60 ml of methyl ethyl ketone was initiated and this addition was continued over a four hour period. At one hour and again at four hours after the start of the continuous addition of the acrylic acid solution, additional 0.2 ml portions of tert-butyl peracetate were introduced into the polymerization mixture. Polymerization was terminated 5.5 hours after initiation and the resultant polymer was recovered and dried, first in air and then in a vacuum oven, to yield 432 grams of rubber-modified styrene-acrylic acid graft copolymer. In order to produce enough copolymer for the compounding and ensuing test work this polymerization procedure was repeated four more times and the products from the five runs were combined and mixed in a Waring blender. The resultant polymer contained about 84.2 weight percent styrene and about 15.8 weight percent acrylic acid. Its rubber content was approximately 18.5 percent based on the weight of the resin phase.

Melt compounding was performed by coextrusion on a 1.5 inch, single-screw extruder (21:1 L:D) using barrel zone temperatures of 500°–510° F. (260°–265.6° C.) a die temperature of 510°–540° F. (265.6°–282.2° C.) and a screw speed of 30–40 rpm. The extrudate was passed through a strand die (approximately 3/16 inch diameter) and into a water cooling bath. The resulting strand was chopped into pellets (approximately 0.1 inch in length) using a strand-pelletizer.

The test pieces were prepared with a Cincinnati-Milacron injection molding machine using a barrel temperature of 475°–500° F. (ca 246°–260° C.), a mold temperature of 135°–150° F. (ca 57°–66° C.) and a cycle time of 45 seconds. The polyblend was visually homogeneous. Injection molding however was difficult and plagued with problems in that most of the shots stuck in the sprue. The physical properties of the test specimens are summarized in Table II which also includes for reference purposes the heat deflection temperatures of the polyethylene terephthalate used in making up the blend.

TABLE II

| Properties | Example V | Control |
|---|---|---|
| Specific Gravity | 1.251 | — |
| Flexural Strength, $10^3$ psi | 9.8 | — |
| Flexural Modulus, $10^3$ psi | 330 | — |
| Izod Impact Strenght*, ft-lb/in | 0.5 | — |
| Izod Impact Strength**, ft-lb/in | 0.3 | — |
| Izod Impact Strength***, ft-lb/in | 2.4 | — |
| HDT @ 264 psi, °C. | 73 | 72 |
| HDT @ 66 psi, °C. | 109 | 74 |

*Using notched ¼ inch test bars
**Using notched ⅛ inch test bars
***Using unnotched ¼ inch test bars
—Means no measurement was made

EXAMPLE VI

Another rubber-modified graft copolymer of styrene and acrylic acid was prepared as in Example V except that in this case the final graft copolymer was formed in two polymerization runs rather than five. In the first of these two polymerization runs the polymerization reactor was charged initially with 700 grams of styrene, 4 grams of terpenolene, 100 ml of ethylbenzene and 100 grams of Stereon-720 (a multi-block styrene-butadiene copolymer containing 10 percent styrene) from The Firestone Tire & Rubber Company. The a solution of 50 grams of acrylic acid in 100 ml of metyl ethyl ketone was introduced into the mixture. Polymerization was initiated by use of a mixture of 1.5 ml tert-butyl peracetate and 1.5 ml of tert-butyl per-neo-decanoate. The continuous addition of a solution of acrylic acid in methyl ethyl ketone was started 1.66 hours after the polymerization had been initiated and this continuous addition occurred over a four hour period. In this instance, the solution contained 50 grams of acrylic acid and 100 ml of methyl ethyl ketone. At 2.5 hours and again at 4 hours after the initiation of polymerization 1.5 ml portions of tert-butyl peracetate were introduced into the reaction mixture. The polymerization was conducted at 85° C. On termination of the polymerization a solution of 2 grams of 1,3,5-trimethyl-2,4,6-tris(3,5-di-tert-butyl-4-hydroxybenzyl)-benzene and 0.8 gram of tris-nonylphenyl phosphite in 50 ml of methyl ethyl ketone was added to the polymerization mixture. The resultant polymer was then recovered and dried, first in air and then in a vacuum oven. In this first run the polymer was produced at a conversion of 60.2 percent. The polymer from this run contained about 85.3 percent styrene and 14.7 percent acrylic acid, and its rubber content was about 17.1 percent based on the weight of the resin phase.

In the second run the initial charge was composed of 700 grams of styrene, 4 grams terpenolene and 100 grams of the Stereon-720 rubber copolymer. Polymerization was initiated by adding to this mixture 1.5 ml of tert-butyl peracetate and 1.5 ml of tert-butyl per-neo-decanoate. Thereupon a continuous addition of acrylic acid was initiated using a solution composed of 100 grams of acrylic acid in a mixture of 100 ml of methyl ethyl ketone and 100 ml of ethyl benzene, and this continuous addition was maintained over a period of 6.2 hours while holding the polymerization temperature at 85° C. After a polymerization period of 6.5 hours the reaction was terminated and a solution composed of 2 grams of 1,3,5-trimethyl-2,4,6-tris(3,5-di-tert-butyl-4-hydroxybenzyl)-benzene and 0.89 gram of tris-nonylphenyl phosphite in 100 ml of methyl ethyl ketone was added. The polymer was recovered and dried in the same manner as in the first run. The polymer, formed in a conversion of 49.2 percent, contained 84.7 percent styrene and 15.3 percent acrylic acid, and had rubber content of 20.2 percent based on the weight of the resin phase.

The polymers from these two runs were combined and mixed in a Waring blender. The resultant polymer mixture contained about 85 percent styrene and about 15 percent acrylic acid. Its content of substrate rubber was about 18 percent based on the weight of the resin phase.

EXAMPLE VII

Into a polymerization reactor equipped with an agitator and a reflux condenser were charged 700 grams of styrene, 4 grams of terpenolene, 200 milliliters of ethyl benzene, and 100 grams of Diene-35, a polybutadiene rubber from The Firestone Tire & Rubber Company. To this was added a solution composed of 50 grams of acrylic acid and 200 milliliters of methyl ethyl ketone. Polymerization at 85° C. was initiated by the addition of 1.5 ml of tert-butyl peracetate and 1.5 ml of tert-butyl per-neo-decanoate. One hour after initiating polymerization continuous addition of acrylic acid was started, and this was continued over a four hour period. This addition involved a total of 50 grams of acrylic acid (no solvent was used). At two hours and again at four hours after initiating polymerization, 1.5 ml portions of tert-butyl per-neo-decanoate were added. Polymerization was terminated after six hours and at that point a solution of 2 grams of 1,3,5-trimethyl-2,4,6-tris(3,5-di-tert-butyl-4-hydroxybenzyl)benzene and 0.8 gram of tris-nonylphenyl phosphite in 100 ml of methyl ethyl ketone was added. The polymer was recovered and dried, first in air and then in a vacuum oven. The product contained about 84 percent styrene and about 16 percent acrylic acid. Its rubber content was about 17 percent based on the weight of the resin phase.

EXAMPLE VIII

Blends of this invention were prepared as in Example V using in one instance the rubber-modified graft copolymer prepared in Example VI and in the other instance the rubber-modified graft copolymer prepared in Example VII. The copolymers were compounded with the same polyethylene terephthalate as used in Example V in the weight proportions of 70% polyethylene terephthalate and 30% terpolymer. Visual inhomogeneities were noted in the compunded products. The physical properties of molded test pieces were determined as in Example V. Table III summarizes the results of the physical property determinations. The heat deflection temperatures for the unblended polyethylene terephthalate used in making these samples were 72° C. (at 264 psi) and 74° C. (at 66 psi).

TABLE III

| Properties | PET + Ex. VI Polymer | PET + Ex. VII Polymer |
|---|---|---|
| Specific Gravity | 1.246 | 1.250 |
| Flexural Strength, $10^3$ psi | 9.5 | 8.2 |
| Flexural Modulus, $10^3$ psi | 360 | 330 |
| Izod Impact Strength*, ft-lb/in | 0.4 | 0.2 |
| Izod Impact Strength**, ft-lb/in | 0.4 | 0.2 |
| HDT @ 264 psi, °C. | 77 | 73 |
| HDT @ 66 psi, °C. | 102 | 97 |

*Using notched ¼ inch test bars
**Using notched ⅛ inch test bars

This invention is susceptible to considerable variation within the spirit and scope of the appended claims.

I claim:

1. A thermoplastic polyblend composition consisting essentially of:
   (A) 95 to 25% by weight of polyethylene terephthalate, or a copolyester or blend thereof containing at least 80 percent by weight of polyethylene terephthalate, and
   (B) 5 to 75% by weight of a thermoplastic copolymer of
      (1) by weight from about 95 to about 70 percent of at least one vinyl aromatic monomer,
      (2) by weight from about 5 to about 30 percent of acrylic acid or methacrylic acid, or both, and
      (3) optionally, at least one additional copolymerizable termonomer.

2. A composition of claim 1 wherein said component (A) is polyethylene terephthalate.

3. A composition of claim 1 wherein said thermoplastic copolymer (B) is a copolymer of a vinyl aromatic monomer and acrylic acid.

4. A composition of claim 3 wherein said vinyl aromatic monomer is predominantly styrene.

5. A composition of claim 1 further including an impact modifier in the polyblend.

6. A composition of claim 5 wherein said impact modifier is an ionomer resin.

7. A composition of claim 5 wherein said impact modifier is a copolyetherester segmented block copolymer.

8. A composition of claim 1 wherein said polyethylene terephthalate has an intrinsic viscosity of between about 0.4 and 1.5 as measured at 25° C. using a solvent consisting of 60% by weight of phenol and 40% by weight of tetrachloroethane.

9. A thermoplastic polyblend composition consisting essentially of:
(A) 95 to 25% by weight, exclusive of the substrate rubber, of polyethylene terephthalate, or a copolyester or blend thereof containing at least 80 percent by weight of polyethylene terephthalate, and
(B) 5 to 75% by weight, exclusive of the substrate rubber, of a rubber-modified thermoplastic copolymer of
(1) by weight from about 95 to about 70 percent of at least one vinyl aromatic monomer,
(2) by weight from about 5 to about 30 percent of acrylic acid or methacrylic acid, or both, and
(3) optionally, at least one additional copolymerizable termonomer,
said copolymer grafted onto a substrate rubber, the rubber being present in amounts up to as much as about 30 percent by weight based on the weight of the copolymerized monomers.

10. A composition of claim 9 wherein said component (A) is polyethylene terephthalate.

11. A composition of claim 9 wherein said thermoplastic copolymer (B) is a rubber-modified graft copolymer of a vinyl aromatic monomer and acrylic acid.

12. A composition of claim 11 wherein said vinyl aromatic monomer is predominantly styrene.

13. A composition of claim 9 further including an impact modifier in the polyblend.

14. A composition of claim 13 wherein said impact modifier is an ionomer resin.

15. A composition of claim 13 wherein said impact modifier is a copolyetherester segmented block copolymer.

16. A composition of claim 9 wherein said polyethylene terephthalate has an intrinsic viscosity of between about 0.4 and 1.5 as measured at 25° C. using a solvent consisting of 60% by weight of phenol and 40% by weight of tetrachloroethane.

17. A thermoplastic polyblend composition consisting essentially of:
(A) 95 to 25% by weight of polyethylene terephthalate, or a copolyester or blend thereof containing at least 80 percent by weight of polyethylene terephthalate, and
(B) 5 to 75% by weight of a thermoplastic copolymer of
(1) by weight from about 95 to about 70 percent of at least one vinyl aromatic monomer,
(2) by weight from about 5 to about 30 percent of acrylic acid or methacrylic acid, or both, and
(3) at least one additional copolymerizable termonomer selected from the group of $C_4$–$C_6$ alpha-olefins, $C_1$–$C_3$ alkyl esters of acrylic or methacrylic acid, acrylonitrile, and methacrylonitrile.

18. A thermoplastic polyblend composition consisting essentially of:
(A) 95 to 25% by weight, exclusive of the substrate rubber, of polyethylene terephthalate, or a copolyester or blend thereof containing at least 80 percent by weight of polyethylene terephthalate, and
(B) 5 to 75% by weight, exclusive of the substrate rubber, of a rubber-modified thermoplastic copolymer of
(1) by weight from about 95 to about 70 percent of at least one vinyl aromatic monomer,
(2) by weight from about 5 to about 30 percent of acrylic acid or methacrylic acid, or both, and
(3) at least one additional copolymerizable termonomer selected from the group of $C_4$–$C_6$ alpha-olefins, $C_1$–$C_3$ alkyl esters of acrylic or methacrylic acid, acrylonitrile, and methacrylonitrile
said copolymer grafted onto a substrate rubber, the rubber being present in amounts up to as much as about 30 percent by weight based on the weight of the copolymerized monomers.

* * * * *

UNITED STATES PATENT AND TRADEMARK OFFICE
CERTIFICATE OF CORRECTION

PATENT NO.  : 4,397,986
DATED       : August 9, 1983
INVENTOR(S) : Edwin D. Hornbaker It is certified that error appears in the above-identified patent and that said Letters Patent is hereby corrected as shown below:

Column 2, line 52, reads "leat" and should read -- least --.

Column 6, line 44, reads "over" and should read -- oven --.

In Table I, the heading of EXAMPLE IV reads, in part, "Hytrel 4065" and should read -- Hytrel 4056 --.

In Table I, the specific gravity shown for Example IV reads "1.234" and should read -- 1.243 --.

Column 8, line 57, reads, in part, Izod Impact Strenght" and should read -- Izod Impact Strength --.

Column 9, line 8, reads "The a solution" and should read -- A solution --.

Column 9, line 9, reads "metyl" and should read -- methyl --.

Column 10, line 32, reads "compunded" and should read -- compounded --.

The right hand numerical value in Column 10, line 46, reads "0.2" and should read -- 0.3 --.

Signed and Sealed this

Seventeenth Day of July 1984

[SEAL]

Attest:

GERALD J. MOSSINGHOFF

Attesting Officer

Commissioner of Patents and Trademarks